United States Patent [19]
Fackler

[11] Patent Number: 6,104,971
[45] Date of Patent: Aug. 15, 2000

[54] CONTROLLER, IN PARTICULAR MOTOR VEHICLE CONTROLLER

[75] Inventor: Rupert Fackler, Pleidelsheim, Germany

[73] Assignee: Robert Bosch GmbH, Stuttgart, Germany

[21] Appl. No.: 08/981,429

[22] PCT Filed: Mar. 13, 1997

[86] PCT No.: PCT/DE97/00497

§ 371 Date: Dec. 23, 1997

§ 102(e) Date: Dec. 23, 1997

[87] PCT Pub. No.: WO97/40430

PCT Pub. Date: Oct. 30, 1997

[30] Foreign Application Priority Data

Apr. 23, 1996 [DE] Germany .................. 196 16 166

[51] Int. Cl.[7] .................................................. G05B 19/42
[52] U.S. Cl. .................................................. 701/36; 701/33
[58] Field of Search .................. 701/29, 35, 33; 395/183.22, 183.18, 200.43; 705/41; 714/5, 18, 23, 46; 709/221, 219

[56] References Cited

U.S. PATENT DOCUMENTS

| | | | |
|---|---|---|---|
| 4,751,633 | 6/1988 | Henn et al. .............................. | 364/200 |
| 5,008,814 | 4/1991 | Mathur .................................... | 364/200 |
| 5,019,799 | 5/1991 | Oshiage et al. ........................ | 340/438 |
| 5,521,588 | 5/1996 | Kuhner et al. ....................... | 340/825.22 |
| 5,712,969 | 1/1998 | Zimmermann et al. ........... | 395/182.03 |
| 5,826,205 | 10/1998 | Koelle et al. .............................. | 701/29 |

FOREIGN PATENT DOCUMENTS

| | | |
|---|---|---|
| 0155403 | 9/1985 | European Pat. Off. . |
| 0215633 | 3/1987 | European Pat. Off. . |
| 4332499 | 3/1995 | Germany . |
| 2125578 | 3/1984 | United Kingdom . |
| WO 91 10201 | 7/1991 | WIPO . |

*Primary Examiner*—Tan Nguyen
*Attorney, Agent, or Firm*—Walter Ottesen

[57] ABSTRACT

A control apparatus, especially a motor vehicle control apparatus, is described having: a first control unit (13), a first programmable memory unit (14), which is assigned to the first control unit and wherein programs and data for the first control unit can be stored; and, a first interface (11) via which programs and data, which are to be stored from an external source (20) in the control apparatus (10), can be transmitted to the first control unit; the first control unit being able to receive the programs and data transmitted thereto and causing a storage of the programs and data into the first memory unit. The described control unit is distinguished by a second interface (12) via which programs and data, which are received via the first interface, can be transmitted by the first control unit to a second control unit (15), the programs and data being provided for storage in a second programmable memory unit, which is assigned to the second control unit and which is storing programs and data for the second control unit.

8 Claims, 1 Drawing Sheet

CONTROLLER, IN PARTICULAR MOTOR VEHICLE CONTROLLER

FIELD OF THE INVENTION

The present invention relates to a control apparatus and especially to a motor vehicle control apparatus; that is, especially a motor vehicle control apparatus having a first control unit, a first programmable memory unit and a first interface. The memory unit is assigned to the first control unit and programs and data can be stored therein for the first control unit. Programs and data, which are to be stored from an external source in the control apparatus, can be transmitted to the first control unit via the first interface. The first control unit can receive the programs and data transmitted thereto and effect storage of the same in the first memory unit.

BACKGROUND OF THE INVENTION

Such a control apparatus is known, for example, from DE 43 32 499 A1.

The configuration of the control apparatus described in this publication makes it possible, in a simple way, to store programs and data in a programmable memory unit provided within the control apparatus. These programs and data are prepared by an external source (programming apparatus in the form of a PC and the like). The programmable memory unit is assigned to a first control unit (microprocessor, microcontroller and the like) and functions to store programs and data for the first control unit. Stated more precisely, the measures for the programming (especially when a so-called flash EPROM or the like is used as a memory unit) are limited essentially so that the external source is connected via an interface line (via an interface cable) or the like electrically to the terminal on the control apparatus provided therefor.

A configuration of this kind therefore makes possible a first time programming or reprogramming of the memory unit even in the built-in state of the control apparatus at any time and in a relatively simple manner.

The situation becomes more complicated, however, when one or several further memory units of a control unit or of several additional control units are to be programmed within the control apparatus.

The provision of several control units can, inter alia, be required because the function of a first control unit (main computer) should be monitored by a second control unit (second or safety computer).

In a corresponding application of the teaching disclosed in the above-mentioned DE 43 32 499 A1, an interface, which is accessible for the connection of external programming apparatus, could be provided in such a case for each control unit. This, in turn, would however make the first-time programming of the control apparatus (such as the programming at the end of an assembly line in a motor vehicle manufacturing facility) as well as also the later reprogramming of the control apparatus (for subsequent error removal or corresponding individual customer desires) considerably more complicated and more susceptible to malfunction.

SUMMARY OF THE INVENTION

The present invention therefore has the object to further improve a control apparatus in such a manner that the programming of several programmable memory units, which are assigned to control units, is always simple and can be carried out free of error.

Accordingly, a second interface is provided via which programs and data received via the first interface can be transmitted from the first control unit to a second control unit. These programs and data are provided for storage in a second programmable memory unit for storing programs and data for the second control unit. The second programmable memory unit is assigned to the second control unit.

In this way, it is sufficient to provide only one single interface for the connection of an external programmable apparatus or the like independently of the number of control units provided in the control apparatus and independently of the number of memory units assigned to these control units.

The first control unit is in the position to selectively store the programs and/or data transmitted to it via this interface, into the memory unit assigned to it or to transmit to another control unit for storage in the memory unit assigned thereto. For this reason, all programs and data, which are to be stored in desired memory units within the control apparatus, can be transmitted via the interface to the first control unit. This interface is designed for connection of an external apparatus.

The limitation of the number of interfaces, which are designed for connection of an external apparatus, to one and its fixed allocation to a specific control unit (first control unit) facilitates a uniform communication between the external source and the control apparatus independently of the finally addressed or addressable control unit or memory unit.

By providing only a single interface, which is designed for connecting an external apparatus, it is therefore furthermore precluded that an error programming occurs by connecting an external programming apparatus to an incorrect interface.

The control apparatus of the invention thereby makes possible that the programming of programmable memory units, which are assigned to several control units, can always be carried out simply and without being subject to error.

The possibility to be able to communicate with different control units (via the detour via the first control unit) furthermore permits an enormous limitation of the type of hardware variations.

Because of the low number of external connections, the control apparatus can be also relatively small and easy to handle.

The invention will be explained in greater detail in the following with respect to an embodiment and with reference to the drawing.

BRIEF DESCRIPTION OF THE DRAWING

The single FIGURE shows a block circuit diagram of an embodiment of the control apparatus of the invention which is connected to an external source.

DESCRIPTION OF THE PREFERRED EMBODIMENTS OF THE INVENTION

Figure 1:
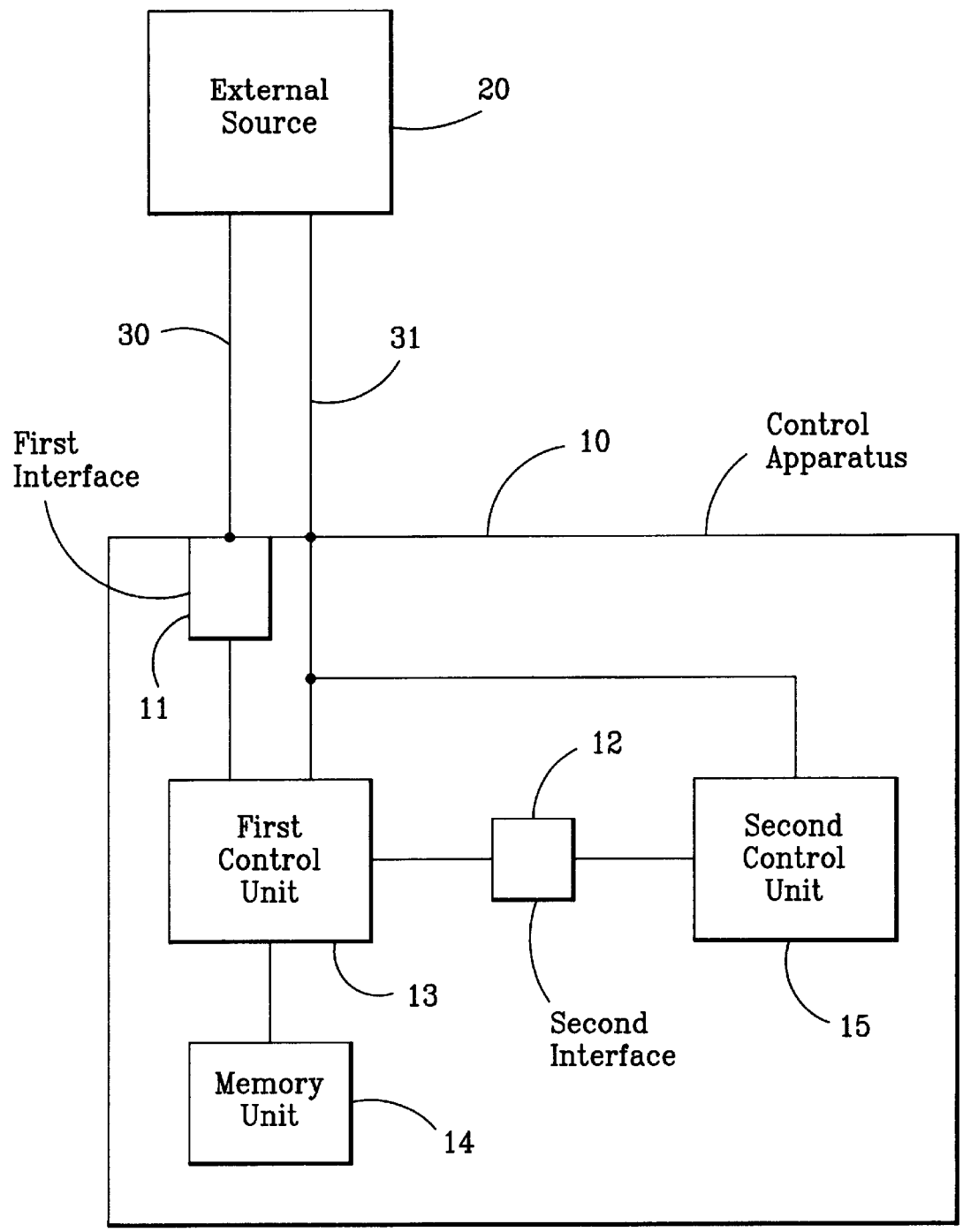

The control apparatus is identified in the FIGURE with the reference numeral 10 and the external source (for programming the control apparatus 10) is identified by the reference numeral 20.

In the present embodiment, the control apparatus 10 serves to control the engine, the transmission, the brakes, et cetera of a motor vehicle. Accordingly, the control apparatus 10 is a motor vehicle control apparatus. However, no limitation of the invention exists with respect to motor vehicle control apparatus. Instead, the invention is applicable anywhere where it is necessary to program or reprogram memory units, which are assigned to several control units (microprocessors, microcontrollers, et cetera) of a control apparatus, via an external programming arrangement.

The control apparatus 10 includes, inter alia, a first interface 11, a second interface 12, a first control unit 13, a first programmable memory unit 14, and a second control unit 15.

In the present embodiment, the external source 20 is a personal computer (PC). Here too, there is no limitation; instead, any desired arrangement can be of consideration, which can transmit programs (more precisely, program codes) and/or data, to the control apparatus 10 for storage in memory units thereof and, in this way, assume the function of a programming station.

The control apparatus 10 is connected to the external source 20 via an interface line 30 so that the apparatus 10 can be programmed. The interface line 30 connects a serial interface (for example, of the type RS 232), which is not shown, and a level transformer (provided as may be required) of the external source 20 to the first (serial) interface 11 of the control apparatus 10 and serves for the bidirectional transmission of code signals, data signals and control signals between the control apparatus 10 and the external source 20. The interface line 30 can, for example, be configured as a so-called K-line which is internationally standardized (ISO-standard) and is utilized very often (almost exclusively) in automobile manufacture.

The control apparatus 10 and the external source 20 are furthermore connected via a programming voltage line 31. A programming voltage, which will be explained later, is transmitted via the line 31 from the external source 20 to the control apparatus 10.

The first interface 11 of the control apparatus 10 is connected to the first control unit 13. As a departure from the illustration in the FIGURE, the control unit 13 can be integrated into the first control unit 13. In the present embodiment, the first control unit 13 is a microcomputer, a microcontroller or the like but can be realized by other control units.

The first control unit 13 is connected to the first programmable memory unit 14. As a departure from the illustration in the FIGURE, the memory unit 14 can be integrated into the first control unit 13. Programs and/or data for the first control unit can be stored in the memory unit 14 assigned to the first control unit 13. In the present embodiment, the first memory unit 14 is realized in the form of an erasable nonvolatile memory such as a so-called flash EPROM. The use of a flash EPROM has been shown here to be especially advantageous because it incorporates the merits of a "normal" EPROM (high memory cell density in a small space) and an EEPROM (electric and therefore simple and convenient erasure of the memory content).

The first control unit 13 is furthermore connected via the second (serial) interface 12 to the second control unit 15. The connection between the first control unit 13 and the second control unit 15 can be configured as a K-line but is usually not because of a lack of effect externally. Departing from the illustration of the FIGURE, the second interface 12 can also be integrated into the first and/or second control unit. The connection of the first control unit 13 and the second control unit 15 via the second interface 12 serves the bidirectional transmission of code signals, data signals and control signals between the first control unit 13 and the second control unit 15.

The second control unit 15 is, as the first control unit 13, a microcomputer, a microcontroller or the like. A second programmable memory unit is assigned to the second control unit. In this memory unit, programs and/or data for the second memory unit are stored. In the present embodiment, this memory unit is integrated into the second control unit.

The second memory unit (not shown in the FIGURE) is assigned to the second control unit 15. The second memory unit is, in the present embodiment, a one-time programmable nonvolatile memory unit, which however cannot be erased. This nonvolatile memory unit can, for example, be an OTPROM (one time programmable ROM). As an alternative or in addition, the second memory unit can also be an erasable nonvolatile memory unit such as a flash EPROM, an EEPROM or the like. The second memory unit is assigned to the second control unit 15 and can be, independent of its configuration, a memory unit provided within or externally of the second control unit 15.

In the present embodiment, the second control unit 15 is a safety computer which monitors the function of the first control unit 13. The function of the second control unit 15 is however not limited hereto. Instead, it can be a control unit utilized for any desired purposes. The control unit has an assigned one-time or multiple-time programmable memory unit, which is integrated into the control unit or is an external memory unit which can be separate. The same applies also to the first control unit.

The programming of the programmable memory units (which are provided in the control apparatus) by the external source operates as follows.

A programming voltage is applied to the control apparatus from the external source 20 via the programming voltage line 31. This programming voltage is transmitted further within the control apparatus to the control units and/or to the assigned memory units and makes possible (if required, in dependence upon the instantaneous operating state of the system) that the particular units are placed in a state of operational readiness in response to corresponding commands or a corresponding drive. This state of operational readiness permits a memory programming or a memory reprogramming.

The programs and/or data, which are to be newly stored in the control apparatus, are supplied to the control apparatus 10 from the external source 20 via the interface line 30. The supplied programs and/or data reach the first control unit 13 via the first interface 11 and are received thereby. The received data are preferably (but not necessarily) intermediately stored in a memory, which is not shown in the FIGURE and is in the form of a RAM or the like.

The received data and/or the control information, which is assigned to the data and is transmitted therewith (commands, status information, et cetera), are investigated by the first control unit 13 as to into which of the memory units of the control apparatus the received programs and/or data are to be supplied.

If it is determined by the first control unit 13 that the received programs and/or data are to be stored in the first programmable memory unit 14, which is assigned to the first control unit 13, then the first control unit 13 (if required, after first erasing corresponding memory unit regions) initiates the transmission and storage of the programs and/or data, which are provided therefor, into the first memory unit 14. The measures which are to be effected for this purpose are known and therefore require no further explanation.

If it is determined by the first control unit 13 that the received programs and/or data are not designated for storage in the first memory unit assigned thereto, that is, they are determined for storage (programming) in the second (or further) programmable memory arrangement assigned to the second (or a further) control unit, then the first control unit 13 initiates the transfer of the programs and/or data to the second (or further) control unit so that the programs and/or data are there stored in a corresponding memory unit or otherwise further transmitted. The programs and/or data were first received by the first control unit.

The communication between the affected control units takes place, in each case, via (serial) interfaces which are provided between these control units (second interface 12 in the case of the transmission from the first control unit 13 to the second control unit 15).

A conversion routine can be provided in the first control unit 13 insofar as the data, which are received by the first control unit 13 from the external source, are present in a sequence, coding, et cetera, which do not permit or at least hinder a further transmission and/or further processing of the programs and/or data. With this conversion routine, the programs and/or data, which are to be transmitted to other control units, can be brought into a form which permits a further transmission and/or further processing. Routines of this kind must, however, not perforce be provided in the first control unit which makes possible the connection to the external source 20. These routines can (at least partially) also be provided in the control units, which are addressed by the first control unit. The provision of conversion routines of this kind makes it possible to exchange the programs, data and control information between the first control unit and the external source always in the same manner and in the same form independently of the target thereof and the later application thereof.

The programs and/or data, which are transmitted from the first control unit 13, are received by the addressed control unit and (if required, while intermediately storing the same) are transmitted for storage to the designated memory unit. The measures, which have to be taken for this purpose, are again generally known and do not require further explanation.

The addressed control unit informs the transmitting control unit as to whether the storage of the received programs and/or data in the assigned memory unit or the further transmission thereof to a further control unit were carried out successfully.

The first control unit 13 informs the external source as to whether the storage of the received programs and/or data into the memory unit provided therefor was successfully carried out.

Only two control units (13, 15) are provided in the described embodiment. However, the invention is not restricted hereto. Rather, any desired number of control units and programmable memory units assigned thereto can be provided.

The number of control units can also be connected as desired, that is, the control units can be either parallel to each other and/or hierarchically in several planes. If a programmable memory is assigned to a unit control unit, the control unit is preferably connected to an interface via which the control unit can receive programs and/or data to be stored in the memory unit from a further control unit. Only the first (or only a few selected ones) control units are connected to interfaces via which programs and/or data can be received directly from an external source.

The time point at which data (received from any desired control unit) are transmitted for storage to the assigned control unit or transmitted to a further control unit must not take place directly after the reception of the programs and/or data. Preferably, a time point is awaited at which neither the transmitting unit nor the receiving unit are occupied with other (more important) tasks. In order to completely preclude a disturbance of the continuing operation of the control apparatus by a programming or reprogramming, it can be provided to undertake the transmission of received programs and/or data to an assigned memory unit and/or to a further control unit only after switching off the control apparatus (in a correspondingly long dimensioned slowing down thereof).

The control unit 10 and the external source 20 can, in the event that this should be necessary, include level converters (not shown) in order to be able to convert the levels of the particular transmitted and/or received signals individually (hardware specific).

The above description of the steps for the programming or reprogramming of the control apparatus made reference primarily to how new programs and/or data, which are to be stored in particular memory units, are handled. However, and in addition, and although this is not explicitly mentioned, corresponding control information (status information, commands, et cetera) between the particular participating components are to be exchanged. These control informations are likewise exchangeable via the particular interfaces. The measures necessary herefor (under circumstances, measures which have to be specifically provided) should be familiar to the technician without a detailed explanation at this point.

The provision of only one (or, if required, several) interfaces, which make possible a connection to external apparatus and the increased provision of interfaces, which make possible a connection between the individual control units within the control apparatus, is not only purposefully useable for the described programming of the control apparatus. To the same extent, it has also been shown advantageous in cases wherein only commands, status information and the like are exchanged (for example, when erasing memory units, when testing the control apparatus by a test apparatus, et cetera). Also in such cases, the limitation of the number of interfaces (which are designed for the connection of external apparatus) leads to a simpler and less fault susceptible manipulation of the control apparatus.

What is claimed is:

1. A control arrangement comprising:

a control apparatus;

an external source for supplying programs and data to said control apparatus;

said control apparatus including:

a first control unit;

a first programmable memory unit assigned to said first control unit;

said first programmable memory unit functioning to store programs and data for said first control unit;

a first interface for transmitting said programs and data from said external source to said control apparatus and to said first control unit;

said first control unit functioning to receive said programs and data transmitted thereto and to effect storing of the transmitted programs and data in said first memory unit;

a second control unit;

a second programmable memory unit assigned to said second control unit and functioning to store programs and data;

a second interface for transmitting programs and data to said second control unit which were received via said first interface;

said programs and data transmitted to said second control unit being provided for said second control unit in said second programmable memory unit; and, said first control unit being so configured that it can further transmit programs and data via said second interface to said second control unit when the programs and data are provided either not for storage in said first memory unit or are provided for storage in said second memory unit, the programs and data being received from said external source and for storage in one of the memory units of said control apparatus.

2. The control arrangement of claim 1, wherein said second control unit is so configured that it receives programs and data transmitted thereto and, in the event that the programs and data are provided for storage in said second memory unit, a storage thereof in said second memory unit is effected.

3. The control arrangement of claim 2, wherein said second control unit is so configured that it informs said first control unit as to whether the attempt to store received programs and data in said second memory unit could be carried out successfully.

4. The control arrangement of claim 1, wherein said first control unit is so configured that it informs said external source as to whether the attempt to store the received programs and data into said first or said second memory unit could be carried out successfully.

5. The control arrangement of claim 1, wherein said external source and said control apparatus are connected by a programming voltage line via which said external source can apply a programming voltage to said control apparatus by means of which said control apparatus can be brought into a programming operating mode permitting a programming of all or of selected memory units.

6. The control arrangement of claim 1, wherein said control units are so configured that received programs and data can be intermediately stored in particular memory units and only at a later time point are stored to the assigned memory unit or are transmitted to a further control unit.

7. The control arrangement of claim 6, wherein said control units are so configured that received programs and data can only be stored in the assigned memory unit in a subsequent running of the control apparatus after it has been switched off.

8. The control arrangement of claim 1, wherein said first interface is the only interface between said external source and said control apparatus.

* * * * *